UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

SILICON-CARBID REFRACTORY ARTICLE.

1,204,211.  Specification of Letters Patent.  Patented Nov. 7, 1916.

No Drawing.  Application filed May 6, 1913.  Serial No. 765,961.

*To all whom it may concern:*

Be it known that I, FRANK J. TONE, a citizen of the United States, residing at Niagara Falls, Niagara county, New York, have invented a new and useful Improvement in Silicon-Carbid Refractory Articles, of which the following is a full, clear, and exact description.

My invention relates to refractory articles, such as bricks, furnace linings, &c., formed of silicon carbid. This material has well known refractory properties, and requires a temperature of about 2220° C. to decompose it. It, therefore, is of high value as a refractory material, but certain difficulties have been encountered in its use. It has been used in two forms—first, that of a pure silicon carbid article without a binder, such as described in my U. S. Patents Nos. 992,698 and 1,013,700. This type is of great refractory value, but is expensive to manufacture.

The second form or type consists of silicon carbid grains or powder, bonded with a ceramic or other binder. The difficulty with this type is that it has been heretofore impossible to produce it with the desired high fusion point or decomposing point on account of the large proportion of binder that has been necessary. The proportion of binder in such cases has been from 20 per cent. upward. In furnace linings silicon carbid has been used with a binder of 10 per cent. of fire clay and 10 per cent. of silicate of soda. This large percentage of binding material lowers the softening or fusing point so that the material is often no more refractory than the best fire clay. Furthermore, the silicate of soda reacts with the silicon carbid at a high temperature and decomposes it, thus further limiting the temperature to which the article can be subjected. With this large proportion of binding material, when exposed to the corrosive action of slags and gases, the binder between the grains is attacked below the desired temperatures and gives a resistance much inferior to the articles of pure silicon carbid above referred to. If on the other hand the amount of binding material is reduced to raise the melting point and increase its resistance, its mechanical strength is very deficient and the bricks or articles have no practical durability or resistance to wear or compression strains.

I have discovered that these difficulties in the manufacture of silicon carbid articles of the binder may be overcome by using a binder which is inert toward silicon carbid at high temperatures especially when the bricks or articles are molded under great pressure. In such case a relatively small amount of binder may be used, such as would be very inefficient with the methods of molding and burning heretofore used; and in addition I reduce the absorptive property of the article and greatly increase the apparent density, especially when the article is burned at relatively high temperatures, which fuse the bond and cause it to exert a maximum binding action.

In carrying out my invention in its preferred form, I preferably use silicon carbid in coarse, granular form, preferably of mixtures of grains from 14 mesh up to about 150 mesh. A mixture of equal parts of No. 16, 24, 36 and 100 mesh has given good results. In certain cases it has been proved desirable to also add finely pulverized silicon carbid to fill interstices and make the article more dense. The binder employed is preferably a kaolin or highly refractory fire clay. This is composed principally of silica and aluminum, neither of which will react with silicon carbid at the softening or vitrifying temperature of the slag. A relatively small amount of this binder is used, for example, 92 per cent. of silicon carbid and 8 per cent. of fire clay, although the binder may be used up to 10 per cent. This mixture is moistened with sufficient water to bring it to about the consistency of molding sand, and is then subjected to a pressure of about three tons or more to the square inch in forming the article. It is then dried and fired at a temperature exceeding 1500° C. and preferably about 1600° C. At this temperature the binder softens or vitrifies and gives a maximum binding efficiency.

As the burning of refractory ware at these temperatures is considerably beyond the range of fire brick kilns or pottery kilns, I have found it necessary to build a special kiln for this purpose. This kiln is built on the principle of an ordinary fire brick kiln but is fired with bituminous coal under forced draft. The lining of the kiln may be made of silica brick or preferably of silicon carbid brick. This high temperature may also be obtained by regenerators. A highly oxidizing atmosphere in the kiln should be avoided.

The articles may also be satisfactorily burned in the electric furnace. In some cases they may be given a preliminary burning in an ordinary fire brick kiln, at ordinary kiln temperatures of say between 1300° and 1400°, and then put in place in the furnace where they are used and the burning completed in actual service. The best results are obtained, however, if they are completely burned before being put into service.

The brick or article resulting from the use of my invention has an apparent density of from 2.40 to 2.55 grams per cubic centimeter.

Its porosity is low, and its mechanical strength and hardness greatly exceeds that of any bonded refractory silicon carbid article heretofore produced.

On account of the closeness of its physical structure and small amount of binder, the article presents a working surface of almost solid silicon carbid and shows a remarkable resistance to heat and the corrosive action of slags and gases. In fact, it stands the action of slags and corrosive gases substantially as well as an article of pure silicon carbid. It can be used in oil furnaces, furnaces using powdered coal, electric furnaces, and various other metallurgical furnaces and in operations where high temperatures are used. Its hardness and resistance also make it useful for refractory structures where there is abnormal abrasion or wear from moving charges or attrition of gases.

The advantages of my invention will be apparent to those skilled in the art, since a bonded silicon carbid brick or article is produced of much higher resistance both to heat, compression strains and abrasion than has heretofore been possible.

Changes may be made in the binder, the method of mixing, burning, etc., without departing from my invention.

I claim:—

1. A silicon carbid refractory article, composed of silicon carbid and a vitrified binder which is inert toward silicon carbid, the silicon carbid consisting of a variety of sizes of grains of such proportion as to give an apparent density of not less than 2.3 when pressed, said binder constituting less than ten per cent. of the article and having a vitrifying temperature of at least 1500 degrees centigrade, and said article having an apparent density of not less than 2.3.

2. The herein described process of making a refractory article of silicon carbid, which consists in mixing a variety of sizes of grains of the silicon carbid in such proportion as to give an apparent density of not less than 2.3 when pressed, with a vitrifiable binder which is inert toward silicon carbid, and in a quantity which will constitute less than ten per cent. of the article, then subjecting the article to pressure, and firing it at a temperature of not less than 1500 degrees centigrade.

3. A silicon carbid refractory article, composed of a variety of different sizes of grains of silicon carbid ranging from a relatively coarse grit to a relatively fine powder, and a vitrified binder which is inert toward silicon carbid, and which has a vitrifying temperature of at least 1500 degrees C., and said article having an apparent density of not less than 2.3.

4. A silicon carbid refractory article, composed of a variety of selected sizes of grains of silicon carbid ranging in size from a relatively fine powder to relative coarse grits, and a clay binder which is inert toward the silicon carbid and which has a vitrifying temperature of at least 1500 degrees C., said article having an apparent density of not less than 2.3.

5. The herein described process of making a refractory article of silicon carbid, which consists in mixing a variety of sizes of grains of the silicon carbid ranging between 14 and 150 mesh with a clay binder which is inert toward the silicon carbid and in a quantity which will constitute less than ten per cent. of the article, then subjecting the article to pressure and firing it at a temperature of not less than 1500 degrees C., the mixture of the sizes of silicon carbid being in such proportion as to give the article an apparent density of not less than 2.3.

In testimony whereof, I have hereunto set my hand.

FRANK J. TONE.

Witnesses:
C. H. CROSSWOOD,
R. B. MANLEY.